United States Patent [19]
Seoh

[11] Patent Number: 5,815,635
[45] Date of Patent: Sep. 29, 1998

[54] IDENTIFICATION CODE PROCESSING APPARATUS FOR DIGITAL VCR

[75] Inventor: Yoon-Seok Seoh, Kyungki-Do, Rep. of Korea

[73] Assignee: LG Electronics Inc., Seoul, Rep. of Korea

[21] Appl. No.: 909,078

[22] Filed: Aug. 14, 1997

Related U.S. Application Data

[63] Continuation of Ser. No. 534,594, Sep. 27, 1995, abandoned.

[30] Foreign Application Priority Data

Sep. 28, 1994 [KR] Rep. of Korea .................. 24571/1994

[51] Int. Cl.$^6$ .................................................. H04N 5/76
[52] U.S. Cl. ............................ 386/113; 386/116; 386/124
[58] Field of Search .................................... 386/2, 12, 20, 386/21, 40, 65, 84, 90, 95, 86, 113, 116, 124, 48, 47; 360/53, 32; H04N 5/76

[56] References Cited

U.S. PATENT DOCUMENTS

| | | | |
|---|---|---|---|
| 4,833,664 | 5/1989 | Shiragami et al. | 358/336 |
| 5,185,740 | 2/1993 | Kurose et al. | 360/32 |
| 5,321,562 | 6/1994 | Hamada et al. | 360/48 |
| 5,339,205 | 8/1994 | Sudoh et al. | 360/53 |
| 5,349,481 | 9/1994 | Kauffman et al. | 360/53 |
| 5,434,719 | 7/1995 | Miller et al. | 360/53 |
| 5,471,351 | 11/1995 | Ishiguro | 360/53 |
| 5,523,856 | 6/1996 | Kawano et al. | 358/336 |

*Primary Examiner*—Tommy P. Chin
*Assistant Examiner*—Luanne D. Din

[57] ABSTRACT

An identification code processing apparatus for digital VCR's wherein data is recorded along with identification codes on a tape so that when an error is generated upon reproducing the identification codes, it is corrected using a reference identification code internally generated, thereby enabling the recorded data to be correctly reproduced. The apparatus includes an identification code adding unit for generating frame and block identification codes on the basis of frame and block synchronous codes and a clock signal, and adding the generated frame and block identification codes to input video data, thereby outputting the resultant video data added with the frame and block identification codes, the identification code adding unit also generating marking signals respectively obtained after encoding frame and block synchronous signals respectively indicating positions of the frame and block identification codes, and an identification code error correcting unit for detecting the identification codes respectively from the block synchronous signals received after being reproduced, comparing each of the detected identification code with a corresponding count identification code generated by the clock signal received after being reproduced, and correcting errors of the identification codes based on the result of the comparison.

18 Claims, 7 Drawing Sheets

IDENTIFICATION CODE PROCESSING APPARATUS FOR DIGITAL VCR

This application is a continuation of application Ser. No. 08/534,594 filed on Sep. 27, 1995, now abandoned.

BACKGROUND OF THE INVENTION

1. Field of the Invention

The present invention relates to an identification code processing apparatus for digital VCR's, and more particularly to an identification code processing apparatus for digital VCR's wherein data is recorded along with identification codes on a tape so that when an error is generated upon reproducing the identification codes, it is corrected using a reference identification code internally generated, thereby enabling the recorded data to be correctly reproduced.

2. Description of the Prior Art

Figure 1:
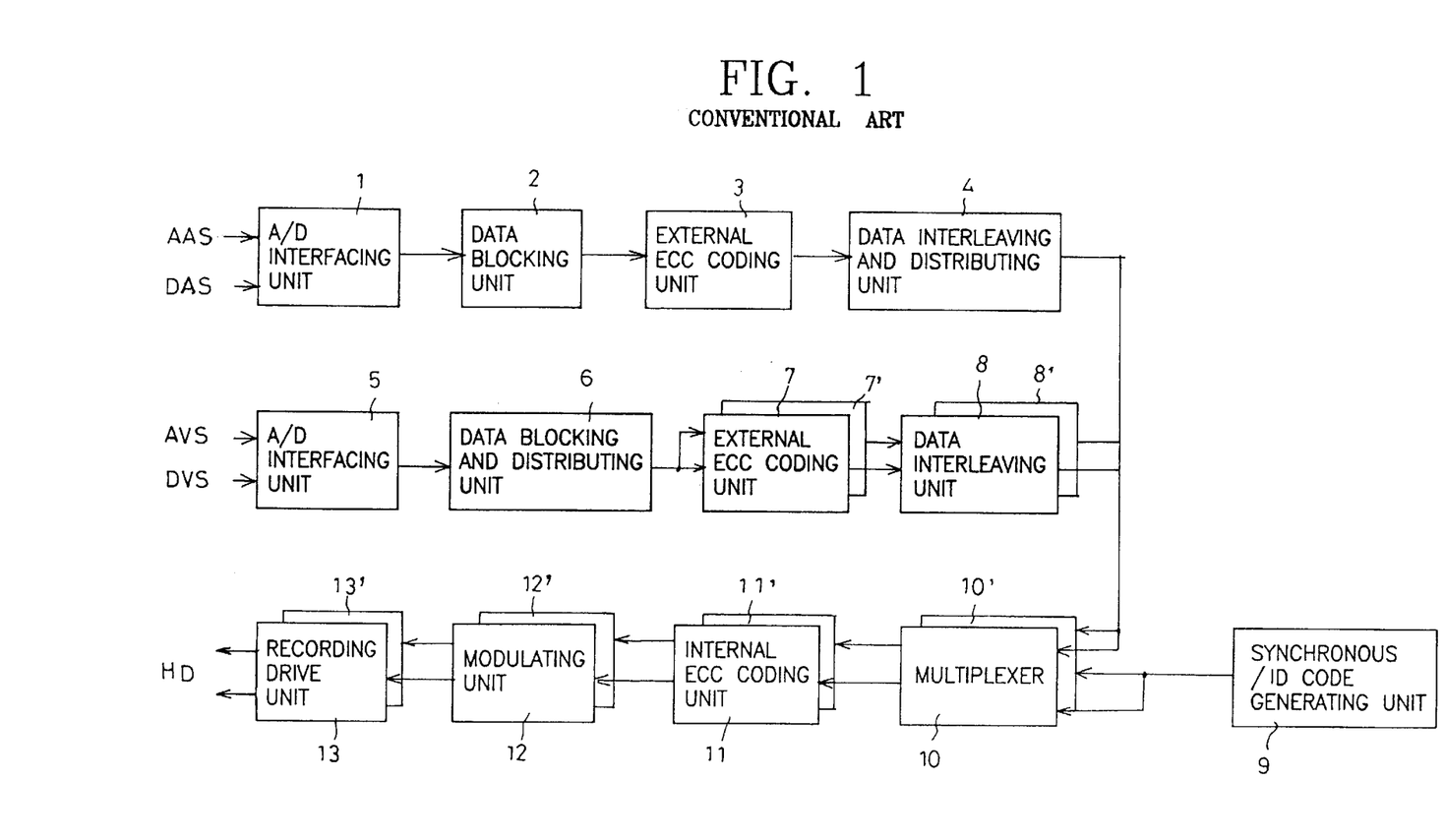
FIG. 1 is a block diagram illustrating a conventional identification code processing apparatus for digital VCR's.

FIG. 1 illustrates a conventional identification code processing apparatus for digital VCR's. As shown in FIG. 1, the identification code processing apparatus includes an A/D interfacing unit 1 for converting an input analog audio signal AAS into a digital audio signal and then interfacing the digital audio signal or directly interfacing an input digital audio signal DAS to the A/D interfacing unit 1, a data blocking unit 2 is coupled which serves to block the audio data output from the A/D interfacing unit 1. Audio data output from the data blocking unit 2 is added with an error correction code for every frame by an external ECC coding unit 3. A data interleaving and distributing unit 4 is also provided which serves to interleave blocked audio data output from the external ECC coding unit 3 for every frame in accordance with a predetermined order and then distributing the interleaved audio data into two channels. The identification code processing apparatus also includes another A/D interfacing unit 5 for converting an input analog video signal AVS into a digital video signal and then interfacing the digital video signal or directly interfacing an input digital video signal DVS. To the A/D interfacing unit 5, a data blocking and distributing unit 6 is coupled which serves to block the video data interfaced by the A/D interfacing unit 5 and to distribute the blocked video data into two channels. The identification code processing apparatus further includes a pair of external ECC coding units 7 and 7' for adding error correction codes respectively to the video data distributed into two channels by the data blocking and distributing unit 6, a pair of data interleaving units 8 and 8' for interleaving blocked video data output from the external ECC coding units 7 and 7' for every frame in accordance with predetermined orders, respectively, and a synchronous/identification code generating unit 9 for generating frame synchronous codes, block synchronous codes and identification codes. A pair of multiplexors 10 and 10' are also provided. The multiplexor 10 serves to insert a frame synchronous code, a block synchronous code and an identification code all generated from the synchronous/identification code generating unit 9 into both one-channel-side audio data output from the data interleaving and distributing unit 4 and the video data output from the data interleaving unit 8. On the other hand, the multiplexor 10' serves to insert another frame synchronous code, another block synchronous code and another identification code all generated from the synchronous/identification code generating unit 9 into both the other-channel-side audio data output from the data interleaving and distributing unit 4 and the video data output from the data interleaving unit 8'. The identification code processing apparatus further includes a pair of internal ECC coding unit 11 and 11' for adding error correction codes respectively to blocks of video and audio data output from the data multiplexors 10 and 10', a pair of modulating units 12 for modulating video and audio data respectively output from the internal ECC coding units 11 and 11', and a pair of recording drive units 13 and 13' for driving heads to record video and audio data respectively output from the modulating units 12 and 12' on a tape.

Operation of the conventional identification code processing apparatus having the above-mentioned arrangement will now be described in conjunction with FIGS. 2 and 3.

When the recording mode is selected by a user, an analog signal AAS or digital audio signal DAS to be recorded on a VCR tape is received to the A/D interfacing unit 1 which, in turn, converts the input analog audio signal AAS into a digital audio signal and then interfacing the digital audio signal. For the input digital audio signal DAS, the A/D interfacing unit 1 directly interfaces it without any processing. The data blocking unit 2 receives the audio signal output from the A/D interfacing unit 1, blocks it into desired block units, and then outputs them for every frame.

The external ECC coding unit 3 receives the audio data output from the data blocking unit 2 for every frame and adds a parity code as an error correction code to the received audio data.

The data interleaving and distributing unit 4 then interleaves audio data blocks constituting the audio data output from the external ECC coding unit 3 for every frame in accordance with a predetermined order in order to convert burst errors generated at the tape into random errors. The data interleaving and distributing unit 4 distributes the interleaved audio data into those to be recorded respectively on channels of the tape.

On the other hand, an input analog video signal AVS or input digital video signal DVS is received to the A/D interfacing unit 5 which, in turn, converts the input analog video signal AVS into a digital video signal and then interfaces the digital video signal. For the input digital video signal DVS, the A/D interfacing unit 5 directly interfaces it without any processing. The interfacing of input video signal by the A/D interfacing unit 5 is carried out for every frame.

The data blocking and distributing unit 6 receives the video signal output from the A/D interfacing unit 5 for every frame, blocks it into desired block units, and then distributes the blocked video data into those of two channels to be recorded respectively on two channels of the tape.

The external ECC coding units 7 and 7' receive the distributed video data from the video data blocking and distributing unit 6, respectively. To the received video data for every frame, the external ECC coding units 7 and 7' add parity codes as error correction codes, respectively. The parity code-added video data are then interleaved by the data interleaving unit 8 and 8', respectively.

Meanwhile, the synchronous/identification code generating unit 9 generates synchronous codes $S_0$ and $S_1$ and identification codes $ID_0$ and $ID_1$ to be added to audio and video data output from the data interleaving and distributing unit 4 and data interleaving units 8 and 8'.

Figure 2:
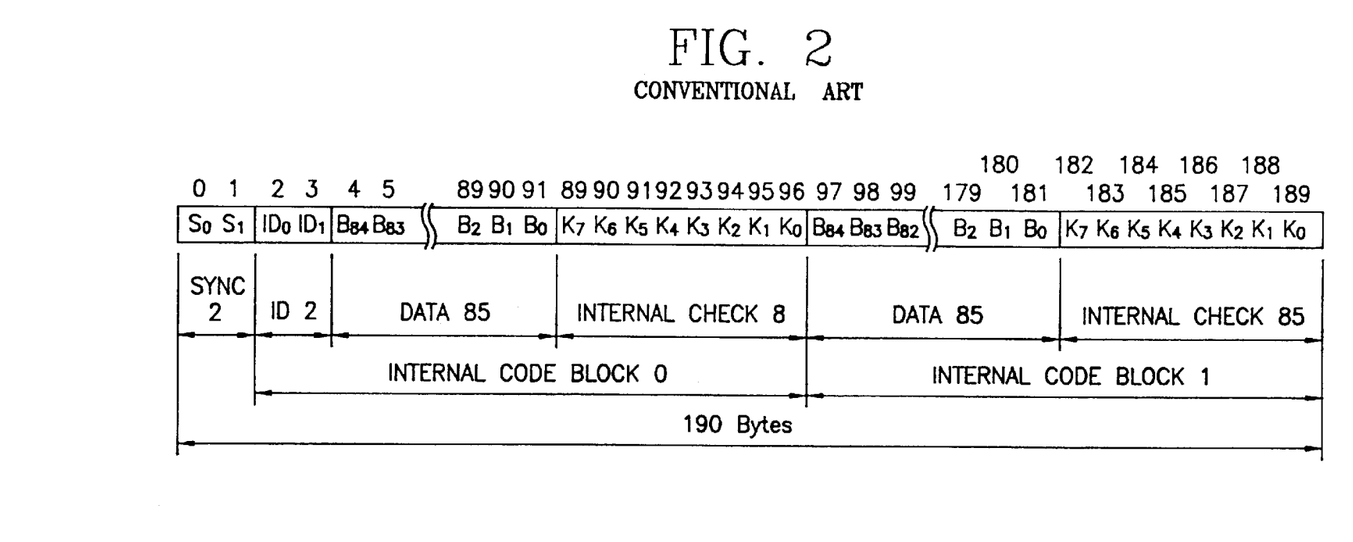
FIG. 2 is a diagram illustrating a data format used in the apparatus of FIG. 1.

As shown in FIG. 2, each of the synchronous codes $S_0$ and $S_1$ and identification codes $ID_0$ and $ID_1$ is constituted by two bytes. The identification code $ID_0$ is indicative of a synchronous block number whereas the identification code $ID_1$ is indicative of a sector identifier.

Figures 3A, 3B:
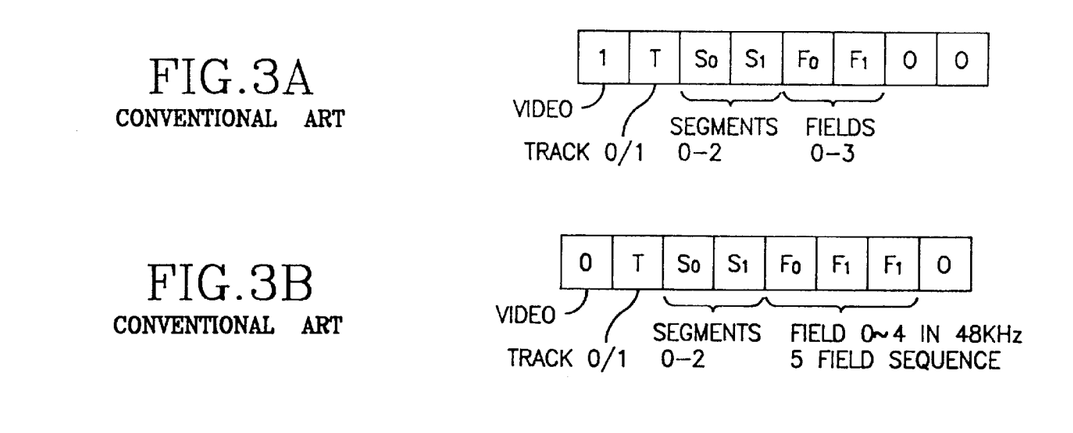
FIGS. 3A and 3B are diagrams respectively illustrating formats of identification codes shown in FIG. 2.

FIG. 3A shows the format of the identification code ID, associated with the case wherein data following the identification codes $ID_0$ and $ID_1$ is video data. On the other hand, FIG. 3B shows the format of the identification code $ID_1$ associated with the case wherein data following the identification codes $ID_0$ and $ID_1$ is audio data.

The multiplexor 10 adds the synchronous codes $S_0$ and $S_1$ and identification codes $ID_0$ and $ID_1$ all generated from the synchronous/identification code generating unit 9 to both one-channel-side audio data output from the data interleaving and distributing unit 4 and the video data output from the data interleaving unit 8. On the other hand, the multiplexor 10 adds the synchronous codes $S_0$ and $S_1$ and identification codes $ID_0$ and $ID_1$ to both the other-channel-side audio data output from the data interleaving and distributing unit 4 and the video data output from the data interleaving unit 8'.

The internal ECC coding unit 11 and 11' add error correction codes respectively to video and audio data output from the data multiplexors 10 and 10' for every block. The error correction code-added data from the internal ECC coding unit 11 and 11' are modulated by the modulating unit 12 and 12', respectively.

In response to outputting of the data from the modulating units 12 and 12', the recording drive units 13 and 13' drive heads to record the output data on the tape.

When the play-back mode is subsequently selected by the user, the identification codes $ID_{0\ and\ ID_1}$ recorded on the tape are detected so that a deinterleaving can be executed using the detected identification codes $ID_{0\ and\ ID_1}$.

In the above-mentioned identification code processing apparatus, identification codes are used only for a memory addressing function required to execute interleaving and deinterleaving processes and for a data position detecting function required to constitute one frame in the speed-variable play-back mode. For this reason, synchronous blocks constituting one frame can not be connected to one another unless clocks reproduced between tracks appear continuously when data reproduction is executed in a high-definition VCR. This is because each frame constituted by several tracks can not coincide with the data being recorded in terms of the number of data. In this case, there is a problem that recorded data of one frame is incorrectly recovered because a block following a block being currently processed is processed before the processing of the current block is finished.

SUMMARY OF THE INVENTION

Therefore, an object of the invention is to provide an identification code processing apparatus for digital VCR's wherein data is recorded along with identification codes on a tape so that when an error is generated upon reproducing the identification codes, it is corrected using a reference identification code internally generated, thereby enabling the recorded data to be correctly reproduced.

In accordance with the present invention, this object is accomplished by providing an identification code processing apparatus for a digital VCR comprising: identification code adding means for generating frame and block identification codes on the basis of frame and block synchronous codes received from the external and a clock signal received from the external, and adding the generated frame and block identification codes to input video data, thereby outputting the resultant video data added with the frame and block identification codes, the identification code adding means also generating marking signals respectively obtained after encoding frame and block synchronous signals respectively indicating positions of the frame and block identification codes; and identification code error correcting means for detecting the identification codes respectively from the block synchronous signals received after being reproduced, comparing each of the detected identification code with a corresponding count identification code generated by the clock signal received after being reproduced, and correcting errors of the identification codes based on the result of the comparison.

BRIEF DESCRIPTION OF THE DRAWINGS

Other objects and aspects of the invention will become apparent from the following description of embodiments with reference to the accompanying drawings in which:

FIGS. 9A to 9D are waveforms of input or output signals associated with various parts of the unit shown in FIG. 6 when no variation in the clock signal occurs, respectively, wherein FIGS. 10A to 10C are waveforms of input or output signals associated with various parts of the unit shown in FIG. 6 when a variation in the clock signal occurs, respectively, wherein

These and other objects of the present application will become more readily apparent from the detailed description given hereafter. However, it should be understood that the preferred embodiments of the invention are given by way of illustration only, since various changes in modification within the spirit scope of the invention will become apparent to those skilled in the art from this detailed description.

DETAILED DESCRIPTION OF THE PREFERRED EMBODIMENTS

Figure 4:
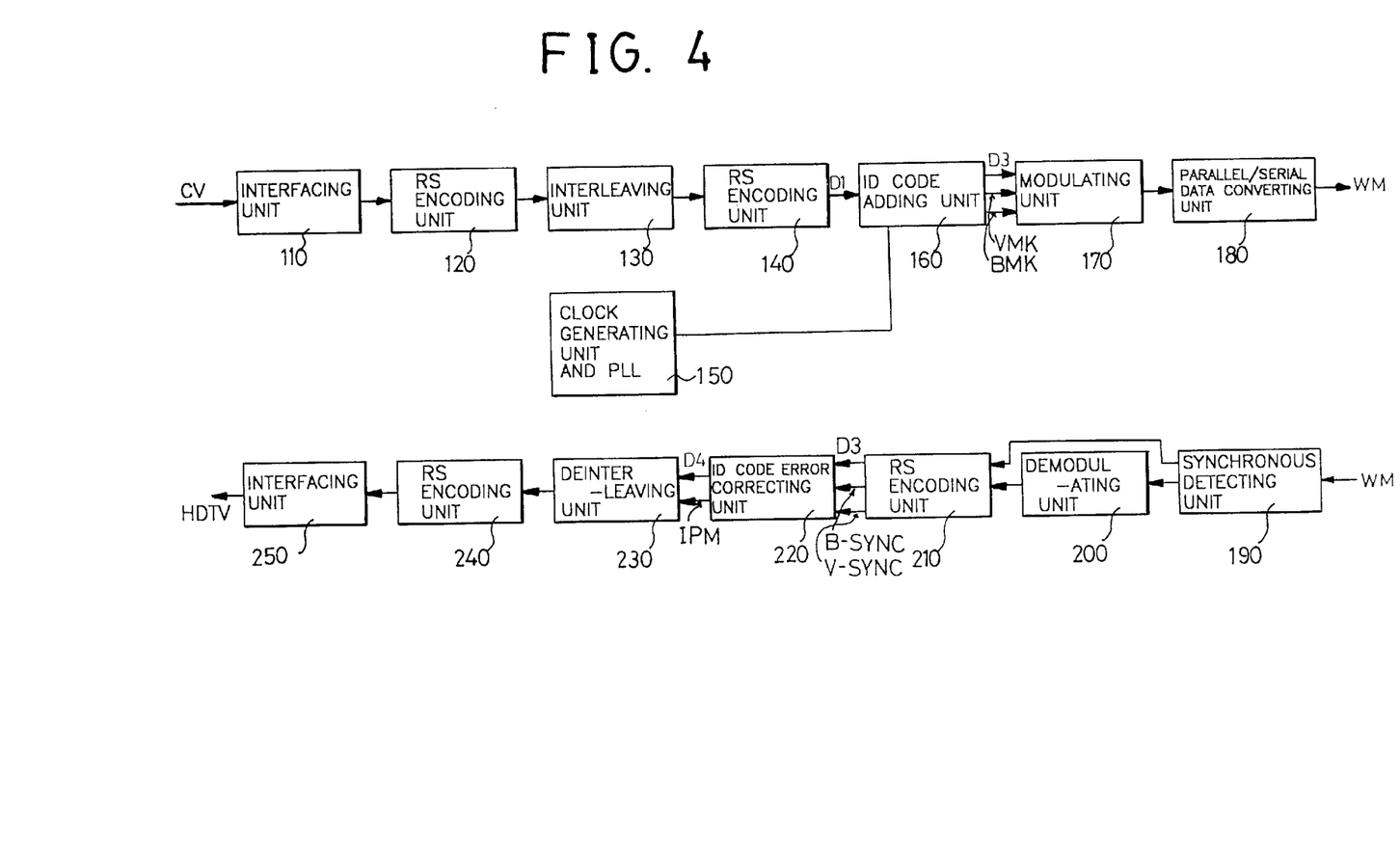
FIG. 4 is a block diagram illustrating an identification code processing apparatus for digital VCR's in accordance with the present invention.

FIG. 4 illustrates an identification code processing apparatus for digital VCR's in accordance with the present invention.

As shown in FIG. 4, the identification code processing apparatus includes an interfacing unit 110 for dividing composite video data CV input from a high-definition television into data blocks for every frame and interfacing the blocked video data for every frame. To the interfacing unit 110, an RS encoding unit 120 is coupled which serves to add a reed solomon code to the video data output from the interfacing unit 110 for every frame. The video data output from the RS encoding unit 120 for every frame is sent to an interleaving unit 130 for every block. The interleaving unit 130 serves to interleave every video data block to another RS encoding unit 140 is coupled which serves to add a reed solomon code to the video data output from the interleaving unit 130 for every block, thereby outputting the resultant video data D1 added with the reed solomon code for every block. A clock generating unit and PLL 150 is also provided which functions to generate clock signals, to make phases of the clock signals coincide with each other and to output the resulting signal as a clock signal CLK. The identification code processing apparatus further includes an identification code adding unit 160 for generating frame and block identification codes on the basis of frame and block synchronous codes VS and BS from the RS encoding unit 140 and the clock signal CLK from the clock signal generating unit and PLL 150. The identification code adding unit 160 also serves to add the generated frame and block identification codes to the video data D1 output from the RS encoding unit 140, thereby outputting the resultant video data D3 added with the frame and block identification codes. The identification code adding unit 160 also outputs marking signals VMK and BMK respectively obtained after encoding the frame and block synchronous signals respectively indicative of the positions of the frame and block identification codes to the identification code adding unit 160, a modulating unit 170 is coupled which serves to modulate video data, including the marking signals VMK and BMK, output from the identification code adding unit 160 and to output the resultant data in the form of parallel data. A parallel/serial converting unit 180 is connected to the modulating unit 170 so as to convert the parallel data output from the modulating unit 170 into serial data which is, in turn, transmitted to a recording medium WM. The identification code processing apparatus further includes a synchronous detecting unit 190 for detecting frame and block synchronous signals from video data reproduced from the recording medium and outputting the detected frame and block synchronous signals and the reproduced video data, a demodulating unit 200 for demodulating the video data output from the synchronous detecting unit 190, and an RS decoding unit 210 for decoding the reed solomon code included, for every frame, in the video data output from the demodulating unit 200, thereby correcting errors of the reproduced data. The RS decoding unit 210 outputs the error-corrected video data along with the frame and block synchronous signals V-SYNC and B-SYNC. To the RS decoding unit 210, an identification code error correcting unit 220 is coupled which detects identification codes respectively from block synchronous signals B-SYNC output from the RS decoding unit 210 and compares each detected identification code with a corresponding count identification code generated by the reproduced clock signal CLK. On the basis of the comparison result, the identification code error correcting unit 220 corrects errors of identification codes and then outputs video data D4 added with the error-corrected identification codes and identification code error determining signals IPM. A deinterleaving unit 230 is also provided which receives the video data D4 and identification code error determining signals IPM from the identification code error correcting unit 220 for every frame, detects the identification codes included in the video data D4 for every frame on the basis of the identification code error determining signals IPM, and deinterleaves the video data D4 of each frame for every block on the basis of the detected identification codes. The identification code processing apparatus further includes another RS decoding unit 240 for decoding the reed solomon code included, for every block, in the video data output from the deinterleaving unit 230, thereby correcting an error of the video data for every block, and another interfacing unit 250 for interfacing the video data, in the form of data blocks, output from the RS decoding unit 240 for every frame and transmitting the resultant video data to the high-definition television HDTV.

Figure 5:
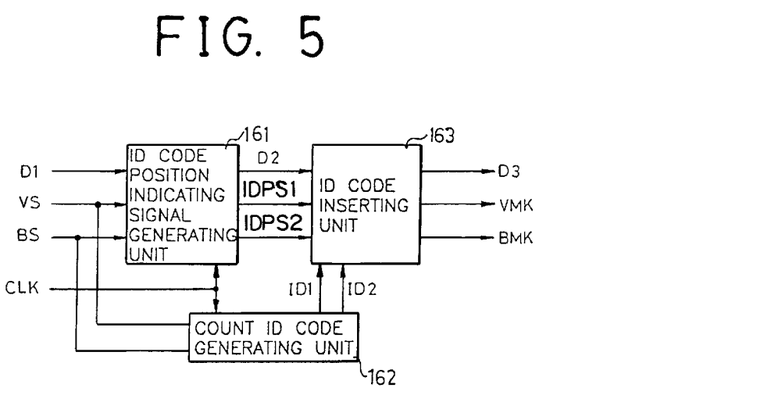
FIG. 5 is a block diagram illustrating an identification code adding unit constituting a part of the apparatus shown in FIG. 4.

As shown in FIG. 5, the identification code adding unit 160 includes an identification code position indicating signal generating unit 161, a count identification code generating unit 162, and an identification code inserting unit 163. The identification code position indicating signal generating unit 161 serves to add frame and block sychronous codes VS and BS received from the RS encoding unit 140 to the video data D1 output from the RS encoding unit 140 and to generate frame and block synchronous signals respectively indicative of the positions of the frame and block synchronous codes VS and BS. On the basis of the generated frame and block synchronous signals, the identification code position indicating signal generating unit 161 generates signals IDPS1 and IDPS2 respectively indicative of the positions of frame and block identification codes, respectively. The identification code position indicating signal generating unit 161 outputs the signals IDPS1 and IDPS2 along with the video data D2 added with the frame and block synchronous codes VS and BS. The count identification code generating unit 162 serves to count the clock signal CLK output from the clock generating unit and PLL 150 on the basis of the frame and block synchronous codes VS and BS received from the RS encoding unit 140 and to generate frame and block count identification codes ID1 and ID2 respectively having code values sequentially incremented on the basis of the counted value. On the other hand, the identification code inserting unit 163 inserts the frame and block identification codes ID1 and ID2 output from the count identification code generating unit 162 into desired positions of the video data D2 designated by the frame and block identification code indicating signals IDPS1 and IDPS2 output from the identification code position indicating signal generating unit 161, respectively. The identification code inserting unit 163 outputs the resultant video data D3 added with the frame and block identification codes ID1 and ID2 along with the marking signals VMK and BMK respectively obtained after encoding the frame and block synchronous signals.

Figure 6:
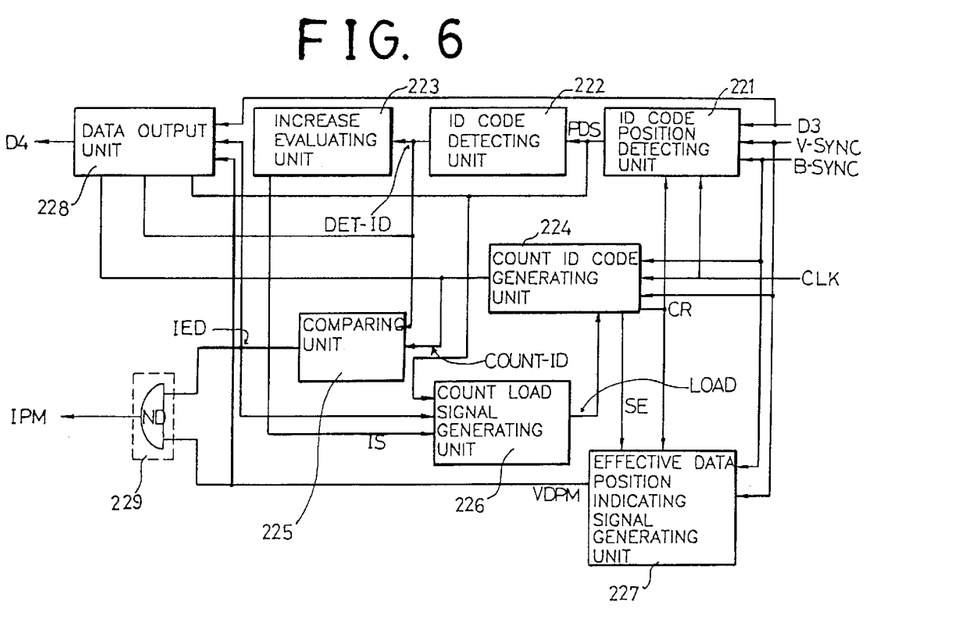
FIG. 6 is a block diagram illustrating an identification code error correcting unit constituting a part of the apparatus shown in FIG. 4.

FIG. 6 shows a block diagram of the identification code error correcting unit 220. As shown in FIG. 6, the identification code error correcting unit 220 includes an identification code position detecting unit 221 adapted to detect the positions of the identification codes respectively from block synchronous signals B-SYNC sequentially output from the RS decoding unit 210 or from carry signals CR sequentially received thereto, thereby sequentially outputting the resultant signals PDS, an identification code detecting unit 222 adapted to detect identification codes DET-ID respectively from the signals PDS output from the identification code position detecting unit 221, and an increase evaluating unit 223 adapted to evaluate whether the identification codes DET-ID have continuously-increased values, respectively, thereby outputting an evaluation result signal IS. A count identification code generating unit 224 is also provided which counts the clock signal CLK received to the identification code position detecting unit 221, thereby generating carry signals CR to be applied to the identification code detecting unit 221. The count identification code generating unit 224 also generates count identification codes COUNT-ID respectively on the basis of the carry signals CR or the block synchronous signals B-SYNC received to the identification code position detecting unit 221, in response to inputting of a load signal LOAD. The count identification code generating unit 224 also generates a signal SE indicative of the end of each segment. The identification code error correcting unit 220 further includes a comparing unit 225 adapted to compare each identification code DET-ID output from the identification code detecting unit 222 with each corresponding count identification code COUNT-ID output from the count identification code generating unit 224, thereby generating an identification code error determining signal IED. To both the comparing unit 225 and the increase evaluating unit 223, a count load signal generating unit 226 is coupled which generates the load signal LOAD on the basis of the identification code error determining signal IED output from the comparing unit 225 as well as the evaluation result signal IS output from the increase evaluating unit 223. The identification code error correcting unit 220 further includes an effective data position indicating signal generating unit 227 adapted to generate a signal VDPM indicative of the position of effective data on the basis of each carry signal CD and each signal SE both output from the count identification code generating unit 224 and each block synchronous signal B-SYNC received to the identification code position detecting unit 221. A data output unit 228 is also provided which serves to insert each identification code DET-ID output from the identification code detecting unit 222 or each count identification code COUNT-ID output from the count identification code generating unit 224 into the data D3 received to the identification code position detecting unit 221 on the basis of each identification code position indicating signal PDS output from the identification code position detecting unit 221, each identification code error determining signal IED output from the comparing unit 225 and each signal VDPM output from the effective data position indicating signal generating unit 227, thereby outputting the resultant data D4. The identification code error correcting unit 220 also includes a logically operating unit 229 adapted to logically operate each identification code error determining signal IED output from the comparing unit 225 and each corresponding effective data position indicating signal VDMK output from the unit 227. The logically operating unit 229 comprises a NAND gate ND.

Operation of the identification code processing apparatus having the above-mentioned arrangement according to the present invention will now be described in conjunction with FIGS. 7 through 11.

When the interfacing unit 110 receives composite video data CV of one frame from the high-definition television after the recording mode is selected, it blocks the received composite video data CV of one frame into desired block units and then interfaces the blocked video data of one frame. The RS encoding unit 120 receives the video data from the interfacing unit 110 for every frame and adds a reed solomon code to the video data for every frame.

In order to convert burst errors, which may be generated upon reproducing the video data output from the RS encoding unit 120, into random errors, the interleaving unit 130 interleaves data blocks constituting the video data output from the RS encoding unit 120 for every frame in accordance with a predetermined order. The interleaved video data is sent to the RS encoding unit 140 which, in turn, adds a reed solomon code to the received video data for every block, thereby outputting the resultant video data D1.

Meanwhile, the clock generating unit and PLL 150 generates clock signals and makes phases of the clock signals coincide with each other, thereby outputting the resulting signal as a clock signal CLK.

The video data D1 from the RS encoding unit 140 is sent to the identification code position indicating signal generating unit of the identification code adding unit 160 along with the frame and block synchronous codes VS and BS. The identification code position indicating signal generating unit 161 adds the frame and block synchronous codes VS and BS received from the RS encoding unit 140 to the video data D1 and generates frame and block synchronous signals respectively indicative of the positions of the frame and block synchronous codes VS and BS.

On the basis of the generated frame and block synchronous signals, the identification code position indicating signal generating unit 161 then generates signals IDPS1 and IDPS2 respectively indicative of the positions of frame and block identification codes, respectively. The identification code position indicating signal generating unit 161 outputs the signals IDPS1 and IDPS2 along with video data D2 added with the frame and block synchronous codes VS and BS.

On the other hand, the count identification code generating unit 162 counts the clock signal CLK received from the identification code position indicating signal generating unit 161 on the basis of the frame and block synchronous codes VS and BS output from the RS encoding unit 140. Every time the counted value reaches a predetermined value, the count identification code generating unit 162 generates frame and block count identification codes ID1 and ID2 respectively having sequentially-incremented code values.

The signals IDSP1 and IDSP2 respectively indicative of the positions of frame and block identification codes is sent to the identification code inserting unit 163, along with the video data D2. The identification code inserting unit 163 inserts the frame and block identification codes ID1 and ID2 output from the count identification code generating unit 162 into desired positions of the video data D2 designated by the frame and block identification code indicating signals IDPS1 and IDPS2, respectively. The identification code inserting unit 163 then outputs the resultant video data D3 added with the frame and block identification codes ID1 and ID2 along with marking signals VMK and BMK respectively obtained after encoding the frame and block synchronous signals.

Figure 8:
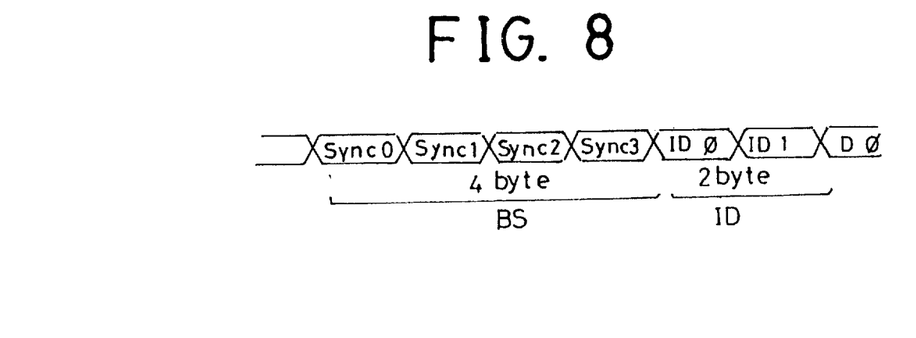
FIG. 8 is a diagram illustrating the data format of one block in the data of FIG. 7.

FIG. 8 shows the format of data added with a block synchronous code BS of 4 bytes, a block identification code ID2 of one byte and a segment of one byte.

The modulating unit 170 receives the video data D3 from the identification code inserting unit 163 of the identification code adding unit 160 along with the marking signals VMK and BMK. The modulating unit 170 modulates the received video data D3 so that it can be recorded on a tape. The resultant video data from the modulating unit 170 is then recorded on the tape in accordance with the format shown in FIG. 7 after passing through the parallel/serial data converting unit 180.

Figure 7:
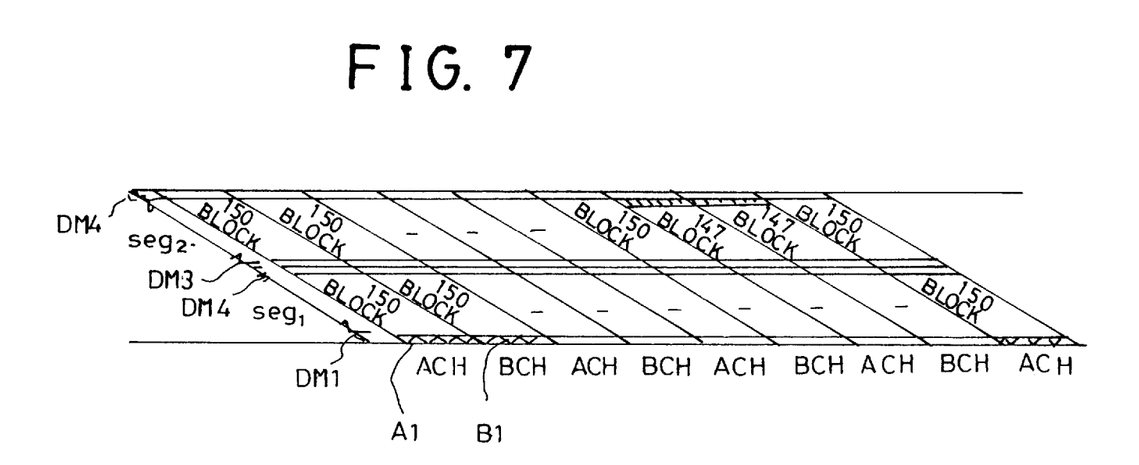
FIG. 7 is a diagram illustrating the format of data recorded on a tape using the apparatus of FIG. 4.

Referring to FIG. 7, the tape is shown as having alternating channels A and B each of which is constituted by a pair of segments seg1 and seg2 each including 150 blocks and data areas DM1 to DM4 each being of 1,191 bytes.

For the first A- and B-channels, each of the first dummy data areas DM1, namely, the areas A1 and B1 is constituted by a dummy data area of 1,187 bytes and a frame synchronous code recording area of 4 bytes. For each of the fourth A- and B-channels, the second segment is constituted by 147 blocks and a dummy data area of 3 blocks.

When the play-back mode is selected by the user, data recorded on a recording medium WM is reproduced by a reproduction head (not shown). The reproduced data is sent to the synchronous detecting unit 190 which, in turn, detects frame and block synchronous signals from the received data. The detected data is then demodulated by the demodulating unit 200.

The output data from the demodulating unit 200 is sent to the RS decoding unit 210 which, in turn, decodes the reed solomon codes added to the data, thereby correcting errors of the data. The RS decoding unit 210 then outputs the error-corrected data D3 along with frame and block synchronous signals V-SYNC and B-SYNC.

The data D3 and frame and block synchronous signals V-SYNC and B-SYNC from the RS decoding unit 210 are sent to the identification code error correcting unit 220 which also receives the clock signal CLK reproduced. Operation of the identification code error correcting unit 220 will now be described in conjunction with FIGS. 9 and 10.

Figure 9A:
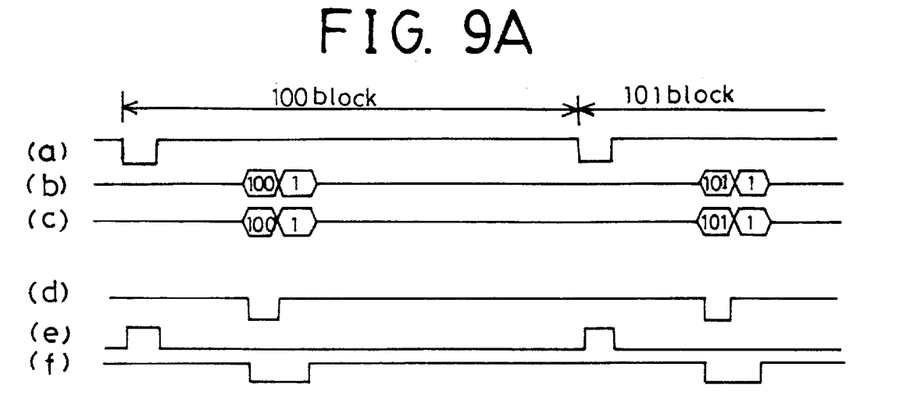
FIG. 9A is for the case involving no error in both the synchronous detection and the identification code detection.

When block synchronous signals B-SYNC of a low level and data D3 respectively associated with, for example, the 100th, 101st, 102nd . . . blocks are sequentially input at the identification code position detecting unit 221 of the identification code error correcting unit 220, as shown by the waveform (a) in FIG. 9A, the identification code position detecting unit 221 first delays the 100th block synchronous signal B-SYNC of the low level, thereby generating a block identification code position indicating signal PDS with a low level as shown by the waveform (f) in FIG. 9A.

The block identification code position indicating signal PDS from the identification code position detecting unit 221 is sent to the identification code detecting unit 222 which, in turn, detects an identification code DET-ID having a code value of 100 from the received signal PDS and then outputs it.

In this manner, block identification codes DET-ID respectively having code values of 101, 102 . . . are then sequentially output.

These block identification codes DET-ID of 100, 101, 102 . . . sequentially output from the identification code detecting unit 222 are sent to the increase evaluating unit 223 which, in turn, aligns the received codes in the inputting order. The increase evaluating unit 223 then evaluates whether a group of the identification codes DET-ID including, for example, three codes, namely, the codes of 100, 101 and 102 have continuously-increased values. For this identification code group, the increase evaluating unit 223 determines that a sequential increase is made. The increase evaluating unit 223 outputs an evaluation result signal IS indicative of the evaluation result.

Meanwhile, the count identification code generating unit 224 counts the clock signal CLK input at the identification code position detecting unit 221. Every time the counted value corresponds to 91, the count identification code generating unit 224 generates a carry signal CR with a high level as shown by the waveform (e) in FIG. 9A.

The count identification code generating unit 224 then delays the generated carry signal CR, thereby generating a count identification code position indicating signal as shown by the waveform (f) in FIG. 9A. On the basis of this signal, the count identification code generating unit 224 generates a count identification code COUNT-ID having a code value of 100.

In this manner, the count identification code generating unit 224 sequentially generates count identification codes COUNT-ID of 100, 101, . . . as shown by the waveform c in FIG. 9A. When a count identification code COUNT-ID having a code value of 150 is generated, the count identification code generating unit 224 generates a signal SE indicative of the end of the associated segment.

The comparing unit 225 sequentially receives the identification codes DET-ID of 100, 101, 102 . . . from the identification code detecting unit 222 and the count identification codes COUNT-ID of 100, 101, 102 . . . from the count identification code generating unit 224. The comparing unit 225 compares each identification code DET-ID with each corresponding count identification code COUNT-ID, thereby generating an identification code error determining signal IED. In the illustrated case, the identification codes DET-ID are determined as corresponding to the count identification codes COUNT-ID, respectively. Accordingly, the comparing unit 225 sequentially outputs identification error determining signals IED with a low level as shown by the waveform (d) in PIG. 9A.

The count load signal generating unit 226 then generates a load signal LOAD on the basis of the identification code error determining signal IED output from the comparing unit 225 as well as the evaluation result signal IS output from the increase evaluating unit 223. On the basis of the load signal LOAD from the count load signal generating unit 226, the count identification code generating unit 224 then outputs the count identification codes COUNT-ID of 100, 101 and 102.

On the other hand, the effective data position indicating signal generating unit 227 generates a signal VDPM indicative of the position of effective data on the basis of the carry signal CD and segment end indicating signal SE output from the count identification code generating unit 224 and the frame and block synchronous signals V-SYNC and B-SYNC received to the identification code position detecting unit 221.

The signal VDPM from the effective data position indicating signal generating unit 227 is sent to the data output unit 228 which also receives the data D3 input at the identification code position detecting unit 221. The data output unit 228 clears identification codes included in effective ones of the received data D3 respectively on the basis of the signals PDS output from the identification code position detecting unit 221.

Thereafter, the data output unit 228 inserts the identification codes DET-ID of 100, 101 . . . output from the identification code detecting unit 222 into the data D3 in accordance with the signals ED from the comparing unit 225, respectively. The data output unit 228 then outputs the resultant data D4.

The NAND gate ND, which is the logically operating unit 229, NANDs each identification code error determining signal IED output from the comparing unit 225 and each corresponding effective data position indicating signal VDPM output from the unit 227, thereby outputting an identification code position indicating signal IPM.

Figure 9B:
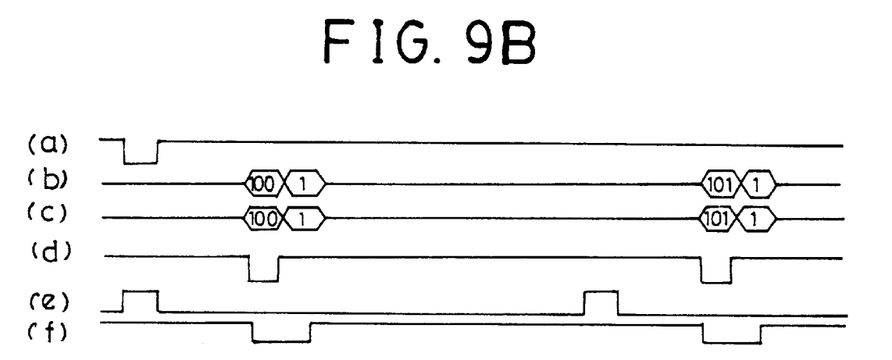
FIG. 9B is for the case involving an error in the synchronous detection while involving no error in the identification code detection.

If the identification code position detecting unit 221 does not receive the block synchronous signal B-SYNC associated with, for example, the 101st block, as shown by the waveform (a) in FIG. 9B, it then receives a high-level carry signal CR, indicative of the 101st block, from the count identification code generating unit 224. On the basis of the carry signal CR, the identification code position detecting unit 221 generates a low-level signal indicative of the identification code position.

Figure 9C:
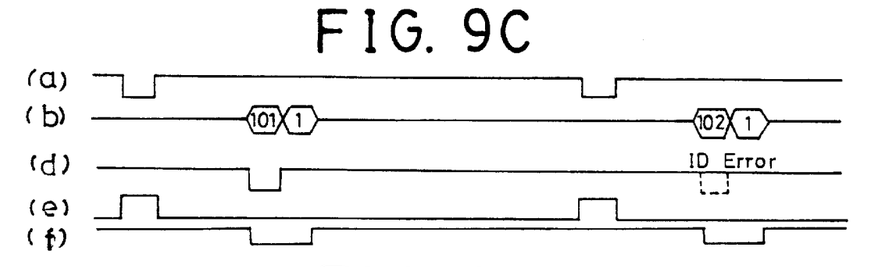
FIG. 9C is for the case involving an error in identification code detection the while involving no error in the synchronous detection.

The subsequent operations carried out by the units 222 to 229 are the same as those in FIG. 9A and the description thereof, therefore, is omitted.

Where an error is involved in an identification code DET-ID output from the identification code detecting unit 222, as in the waveform (b) in FIG. 9C showing that the identification code corresponding to the 101st block indicates the 102nd block erroneously, the increase evaluating unit 223 receives block identification codes DET-ID of 100, 102, 102 . . . sequentially. The increase evaluating unit 223 then evaluates whether the identification codes DET-ID of 100, 102, 102 . . . have continuously-increased values. In this case, the increase evaluating unit 223 determines that no sequential increase is made for the identification codes DET-ID. The increase evaluating unit 223 then outputs an evaluation result signal IS indicative of the evaluation result.

Meanwhile, the count identification code generating unit 224 generates carry signals CR, respectively indicative of the 100th, 101st . . . blocks, as shown by the waveform e in FIG. 9C. On the basis of the carry signals, the count identification code generating unit 224 generates low-level signals respectively indicative of identification code positions. By counting these signals, the count identification code generating unit 224 then generates count identification codes COUNT-ID respectively having code values of 100, 101, . . . in a sequential manner.

The comparing unit 225 sequentially compares the identification codes DET-ID of 100, 102 . . . output from the identification code detecting unit 222 with the corresponding count identification codes COUNT-ID of 100, 101 . . . output from the count identification code generating unit 224. For the 101st block, the comparing unit 225 generates an identification code error determining signal IED with a high level as shown by the waveform (d) in FIG. 9C.

The count load signal generating unit 226 then generates a load signal LOAD on the basis of the identification code error determining signal IED output from the comparing unit 225 as well as the evaluation result signal IS output from the increase evaluating unit 223.

On the basis of the load signal LOAD from the count load signal generating unit 226, the count identification code generating unit 224 then outputs the count identification codes COUNT-ID of 100, 101 . . .

On the basis of the high-level signal IED output from the comparing unit 225, the data output unit 228 inserts the identification code DET-ID of 101 output from the count identification code generating unit 224 into the identification code position of the 101st block in the data D3. The data output unit 228 then outputs the resultant data D4.

Figure 9D:
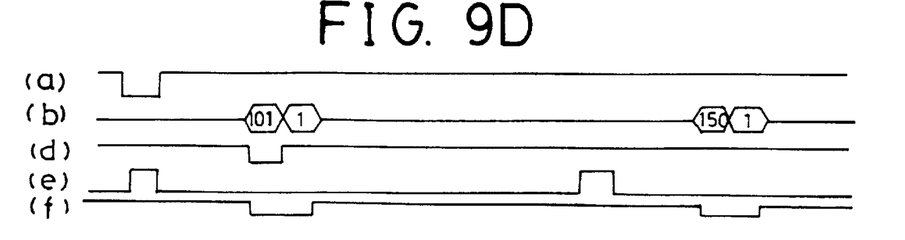
FIG. 9D is for the case involving errors in both the synchronous detection and the identification code detection.

In this case, the logically operating unit 229 operates in the same manner as in the above-mentioned case.

Where an error is involved in an identification code DET-ID output from the identification code detecting unit 222 due to an erroneous block synchronous signal B-SYNC input at the identification code position detecting unit 221, as in the waveform b in FIG. 9D showing that the identification code corresponding to the 101st block indicates the 150th block erroneously, the increase evaluating unit 223 receives block identification codes DET-ID of 100, 150 . . . and aligns them sequentially. The increase evaluating unit 223 then evaluates whether the identification codes DET-ID aligned in the order of 100, 150 . . . have continuously-increased values. In this case, the increase evaluating unit 223 determines that no sequential increase is made for the identification codes DET-ID. The increase evaluating unit 223 then outputs an evaluation result signal IS indicative of the evaluation result.

Meanwhile, the count identification code generating unit 224 sequentially generates count identification codes COUNT-ID respectively having code values of 100, 101, . . . in a manner as mentioned above.

Thereafter, the comparing unit 225 sequentially compares the identification codes DET-ID of 100, 150 . . . output from the identification code detecting unit 222 with the corresponding count identification codes COUNT-ID of 100, 101 . . . output from the count identification code generating unit 224. As a result, the comparing unit 225 generates identification code error determining signals IED which have a low level for the 100th block and a high level for the 101st block as shown by the waveform (d) in FIG. 9D.

The count load signal generating unit 226 then generates a load signal LOAD on the basis of the identification code error determining signal IED output from the comparing unit 225 as well as the evaluation result signal IS output from the increase evaluating unit 223.

On the basis of the load signal LOAD from the count load signal generating unit 226, the count identification code generating unit 224 then outputs the count identification codes COUNT-ID of 100, 101, 102 . . .

On the basis of the high-level signal IED output from the comparing unit 225, the data output unit 228 inserts the identification code DET-ID of 101 output from the count identification code generating unit 224 into the identification code position of the 101st block in the data D3. The data output unit 228 then outputs the resultant data D4.

Figure 10A:
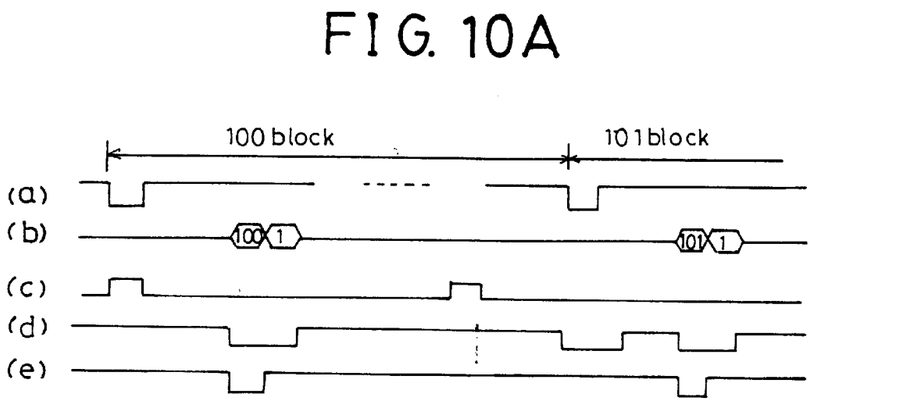
FIG. 10A is for the case involving no error in both the synchronous detection and the identification code detection.

In this case, the logically operating unit 229 operates in the same manner as in the above-mentioned case.

Where an error is involved in a carry signal CR output from the count identification code generating unit 224 due to an increased clock speed of the clock signal CLK input at the count identification code generating unit 224, as in the waveform (c) in FIG. 10A showing that the 101st carry signal CR is erroneously generated at a position before its correct position, the count identification code generating unit 224 generates a signal indicative of the position of the associated count identification code COUNT-ID as shown by the waveform (d) in FIG. 10A. The count identification code generating unit 224 then counts the generated signal, thereby generating a count identification code COUNT-ID having a code value of 101.

In this case, the subsequent operations carried out by the units 222 to 229 are the same as those in FIG. 9A and the description thereof, therefore, is omitted.

Figure 10B:
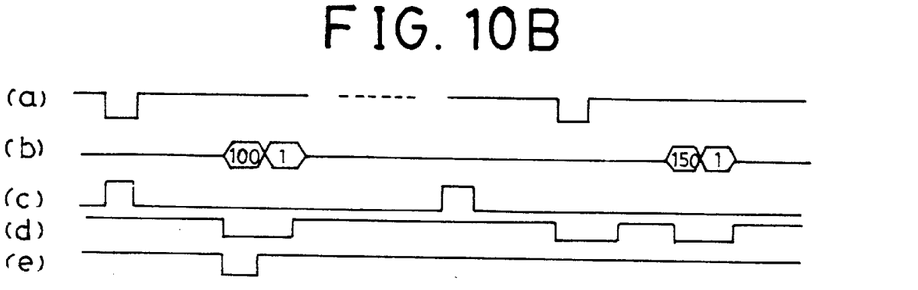
FIG. 10B is for the case involving an error in identification code detection the while involving no error in the synchronous detection.

FIG. 10B shows the case wherein errors are involved in both the identification code DET-ID, associated with the 101st block, output from the identification code detecting unit 222 and the carry signal CR, associated with the 101st block, output from the count identification code generating unit 224, as in the waveforms (b) and (c) in FIG. 10B. In this case, the count identification code generating unit 224 generates a signal indicative of the position of the associated count identification code COUNT-ID as shown by the waveform (d) in FIG. 10B in the same manner as mentioned above. The count identification code generating unit 224 then counts the generated signal, thereby generating a count identification code COUNT-ID having a code value of 101.

In this case, the subsequent operations carried out by the units 222 to 229 are the same as those in FIG. 9A and the description thereof, therefore, is omitted.

Figure 10C:
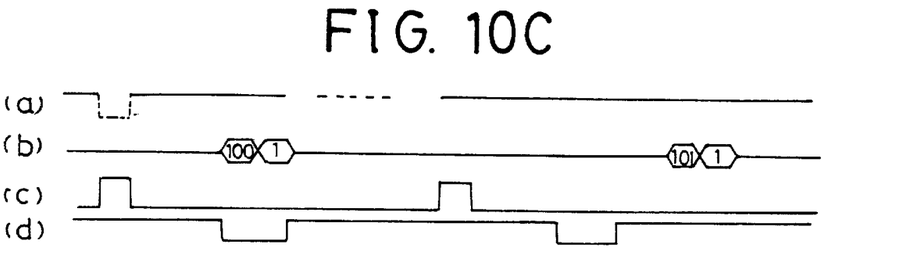
FIG. 10C is for the case involving errors in both the synchronous detection and the identification code detection.

FIG. 10C shows the case wherein the 101st carry signal CR is erroneously generated at a position before its correct position, as shown by the waveform (a) in FIG. 10C, under a condition that the identification code position detecting unit 221 does not receive the block synchronous signal B-SYNC associated with the 101st block, as shown by the waveform (a) in FIG. 10C. In this case, it is impossible to reproduce the identification codes recorded on the tape.

In either case, the deinterleaving unit 230 then detects the identification codes included in the data D4 and the identification code error determining signals IPM, and deinterleaves the data D4 in the form of original block data on the basis of the detected identification codes.

The RS decoding unit 240 receives the data output from the deinterleaving unit 230 and decodes the reed solomon code included, for every block, in the data, thereby correcting an error of the data for every block. Every frame of the data output from the RS decoding unit 240 is then transmitted to the high-definition television HDTV via the interfacing unit 250.

As apparent from the above description, the present invention provides an identification code processing apparatus for digital VCR's capable of correcting errors of identification codes or errors caused by no detection of synchronous signals by evaluating the continuity of identification codes and using reference identification codes internally generated. In accordance with the present invention, errors generated during the memory addressing of deinterleaved data can be removed using the correct identification codes. Accordingly, it is possible to correctly recover frame data in the play-back mode.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An identification code processing apparatus for a digital video tape recorder comprising:

identification code adding means for generating frame block identification codes on a basis of frame and block synchronous codes received externally and a clock signal received externally, and adding the generated frame block identification codes to input video data, thereby outputting resultant video data with frame and block identification codes, the identification code adding means generating marking signals obtained after encoding frame and block synchronous signals indicating positions of the frame and block identification codes; and identification code error correcting means for detecting the identification codes from the block synchronous signals received after being encoded, comparing the detected identification codes with corresponding count identification codes generated by the clock signal, and correcting the detected identification codes using the corresponding count identification codes based on a result of the comparison.

2. The identification code processing apparatus in accordance with claim 1, wherein the identification code adding means comprises:

identification code position indicating signal generating means for adding the frame and block synchronous codes, received externally, to the input video data, generating the frame and block synchronous signals indicating positions of the frame and block synchronous codes, and generating signals indicative of the positions of frame and block identification codes on a basis of the generated frame and block synchronous signals;

count identification code generating means for counting the clock signal received externally on the basis of the frame and block synchronous codes received externally, and generating frame and block count identification codes having code values sequentially incremented on a basis of a counted value; and identification code inserting means for inserting the frame and block identification codes output from the count identification code generating means into desired positions of the video data designated by the frame and block identification codes indicating signals output from the identification code position indicating signal generating means.

3. The identification code processing apparatus in accordance with claim 1, wherein the identification code error correcting means corrects the errors of the detected identification codes during reproduction.

4. The identification code processing apparatus in accordance with claim 3, wherein the identification code error correcting means comprises:

identification code position detecting means for detecting the positions of the identification codes from block synchronous signals sequentially received thereto or from carry signals sequentially received thereto, thereby sequentially outputting resultant signals;

identification code detecting means for detecting the identification codes from the resultant signals output from the identification code position detecting means;

increase evaluating means for evaluating whether the identification codes have continuously-increased values, thereby outputting evaluation result signals;

count identification code generating means for counting the clock signal received to the identification code position detecting means, thereby generating carry signals and signals indicating respective ends of segments, generating count identification codes on a basis of the carry signals or the block synchronous signals received to the identification code position detecting means, and outputting the generated count identification codes, carry signals and segment end indicating signals on a basis of load signals received thereto;

comparing means for comparing identification codes output from the identification code detecting means with corresponding count identification code output from the count identification code generating means, thereby generating identification code error determining signals; and error processing means for correcting errors of identification codes output from said identification code detecting means using corresponding count identification code output from said count identification code generating means based on said identification code error determining signals.

5. The identification code processing apparatus in accordance with claim 4, wherein the error processing means comprises:

count load signal generating means for generating the load signals on a basis of the identification code error determining signals output from the comparing means as well as the evaluation result signals output from the increase evaluating means; and effective data position indicating signal generating means for generating signals indicating positions of effective data on the basis of the carry signals and segment end indicating signals output from the count identification code generating means and the block synchronous signals received to the identification code position detecting means.

6. The identification code processing apparatus in accordance with claim 4, wherein the error processing means further comprises:

data output means for inserting the identification codes output from the identification codes output from the count identification code generating means into the data received to the identification code position detecting means on a basis of the identification code position indicating signal output from the identification code position detecting means, the identification code error determining signals output from the comparing means and the signals output from the effective data position indicating signal generating means, thereby outputting the resultant data; and logically operating means for logically operating each identification code error determining signal output from the comparing means and each corresponding effective data position indicating signal output from the effective data position indicating signal generating means.

7. An identification code processing apparatus for a digital video tape recorder comprising:

means for adding identification codes to video data and outputting marking signals;

means for generating corresponding identification codes to said added identification codes;

means for detecting, based on said marking signals, said added identification codes;

means for comparing said detected identification codes with said corresponding identification codes and outputting a comparison result; and means for correcting said added identification codes using said corresponding identification codes based on said comparison result.

8. The apparatus of claim 7, wherein said means for correcting errors corrects said errors of said added identification codes during reproduction.

9. The apparatus of claim 7, wherein said added identification codes include sequentially incremented code values.

10. The apparatus of claim 9, wherein said corresponding identification codes include count identification codes.

11. The apparatus of claim 10, wherein said means for comparing compares said sequentially incremented code values with said count identification codes and outputs said comparison result.

12. The apparatus of claim 11, wherein said means for correcting errors corrects said added identification codes with said count identification codes based on said comparison result.

13. A method for processing identification codes for a digital video tape recorder comprising the steps of:

adding identification codes to video data and outputting marking signals;

generating corresponding identification codes to said added identification codes;

detecting, based on said marking signals, said added identification codes;

comparing said detected identification codes with said corresponding identification codes and outputting a comparison result; and correcting said added identification codes using said corresponding identification codes based on said comparison result.

14. The method of claim 13, wherein the step of correcting errors is performed during reproduction.

15. The method of claim 13, including the step of:

sequentially incrementing code values in said added identification codes.

16. The method of claim 15, including the step of:

generating count identification codes in said corresponding identification codes.

17. The method of 16, including the step of:

comparing said sequentially incremented code values with said count identification codes and outputting said comparison result.

18. The method of claim 17, including the step of:

correcting said added identification codes with said count identification codes based on said comparison result.

* * * * *